United States Patent
Lattanzi et al.

(10) Patent No.: US 12,225,997 B2
(45) Date of Patent: Feb. 18, 2025

(54) PROCESS FOR PRODUCING LIPSTICKS WITH SPECIAL TRIDIMENSIONAL SURFACE EFFECTS AND LIPSTICKS OBTAINED BY SUCH PROCESS

(71) Applicant: INTERCOS S.p.A., Milan (IT)

(72) Inventors: Giuseppe Lattanzi, Misinto (IT); Fabio Leone, Casirate D'Adda (IT)

(73) Assignee: INTERCOS S.p.A., Milan (IT)

( * ) Notice: Subject to any disclaimer, the term of this patent is extended or adjusted under 35 U.S.C. 154(b) by 657 days.

(21) Appl. No.: 17/259,295

(22) PCT Filed: Jan. 31, 2019

(86) PCT No.: PCT/IB2019/050793
§ 371 (c)(1),
(2) Date: Jan. 11, 2021

(87) PCT Pub. No.: WO2020/012250
PCT Pub. Date: Jan. 16, 2020

(65) Prior Publication Data
US 2021/0251367 A1 Aug. 19, 2021

(30) Foreign Application Priority Data
Jul. 13, 2018 (IT) .................... 102018000007184

(51) Int. Cl.
*A45D 40/16* (2006.01)
*B29C 33/38* (2006.01)
(Continued)

(52) U.S. Cl.
CPC .......... *A45D 40/16* (2013.01); *B29C 33/3842* (2013.01); *A45D 2040/0012* (2013.01); *A45D 2040/0025* (2013.01); *B29C 33/76* (2013.01)

(58) Field of Classification Search
CPC ............ A45D 40/16; A45D 2040/0012; A45D 2040/0025; B29C 33/3842; B29C 33/76
(Continued)

(56) References Cited

U.S. PATENT DOCUMENTS

| 6,022,209 A | 2/2000 | Kuo |
| 2002/0086079 A1 | 7/2002 | Kuo |

(Continued)

FOREIGN PATENT DOCUMENTS

| JP | 5-57336 | 3/1993 |
| JP | 2000-300338 | 10/2000 |

(Continued)

OTHER PUBLICATIONS

Kayatsu et al., JP2001-072541, published Mar. 21, 2001, machine translation to English (Year: 2001).*

(Continued)

*Primary Examiner* — Galen H Hauth
*Assistant Examiner* — Lawrence D. Hohenbrink, Jr.
(74) *Attorney, Agent, or Firm* — Wenderoth, Lind & Ponack, L.L.P.

(57) ABSTRACT

A lipstick (13, 17, 19, 21, 23) with external lateral surface having a tridimensional design is obtained by a process comprising laser-working the external lateral surface of a head part (2), previously mirror-polished, of a rough tap (1). The process may include the final pearling of the lipstick (13, 17, 19, 21, 23) by means of a cyclone system (14) to obtain a pearled lipstick (16, 18, 20, 22, 24).

16 Claims, 7 Drawing Sheets

(51) Int. Cl.
*A45D 40/00* (2006.01)
*B29C 33/76* (2006.01)

(58) Field of Classification Search
USPC ........................................................ 264/219
See application file for complete search history.

(56) References Cited

U.S. PATENT DOCUMENTS

2007/0295887 A1   12/2007  Kuo
2008/0110869 A1    5/2008  Chen

FOREIGN PATENT DOCUMENTS

| JP | 2001-72541 | | 3/2001 |
|---|---|---|---|
| JP | 2001072541 A | * | 3/2001 |
| JP | 2001258640 A | * | 9/2001 |
| JP | 2003-231611 | | 8/2003 |
| JP | 2003231611 A | * | 8/2003 |
| JP | 2004-252474 | | 9/2004 |
| JP | 2009-226858 | | 10/2009 |
| JP | 5388261 | | 1/2014 |
| KR | 10-0317449 | | 11/2001 |
| KR | 10-2007-0034141 | | 3/2007 |
| KR | 10-0698920 | | 3/2007 |
| KR | 10-0709999 | | 4/2007 |

OTHER PUBLICATIONS

Oto et al., JP2003-231611, published Aug. 19, 2003, machine translation to English (Year: 2003).*

Oxford English Dictionary online, https://www.oed.com/search/advanced/Entries?q=velvet&sortOption=Frequency, accessed Apr. 5, 2024 (Year: 2024).*

Goto, JP2001258640A, Sep. 25, 2001, machine translation to English (Year: 2001).*

International Search Report and Written Opinion of the International Searching Authority issued Apr. 1, 2019 in International (PCT) Application No. PCT/IB2019/050793.

* cited by examiner

PROCESS FOR PRODUCING LIPSTICKS WITH SPECIAL TRIDIMENSIONAL SURFACE EFFECTS AND LIPSTICKS OBTAINED BY SUCH PROCESS

The present invention relates to a process for producing lipsticks with special tridimensional surface effects, and to the thus obtainable lipstick types.

The normal lipsticks, i.e. those intended to be coupled to an appropriate supporting base which can be axially moved within a casing, usually have a lateral surface which is free of any particular visual effect.

Lipstick users would instead appreciate the possibility of having a lipstick worked on the outside which, in addition to attracting their attention at the time of purchase, could confer a different, more original cosmetic effect, not just of coloring, to the user's lips.

It is the object of the present invention to provide a process adapted to produce a lipstick with special tridimensional surface effects capable of resulting, on the user's lips, in a different, original and pleasant cosmetic effect, appreciated by the user and by the observer.

According to present invention, such an object is achieved by a process comprising the following succession of steps:
 a) forming a metallic tap with a head part shaped as a lipstick with a rough external lateral surface;
 b) mirror-polishing the external lateral surface of the head part of said metallic tap to obtain a head part with a polished external lateral surface;
 c) laser-working the polished external lateral surface of said head part to obtain a tap with laser-worked tap with external lateral surface on the head part worked according a desired tridimensional design;
 d) forming, inside a molding space and on the outside of said tap with worked head, a hollow ogive of malleable plastic material with an internal cavity shaped so as to be complementary with said tridimensional design;
 e) introducing the ogive with the shaped internal cavity facing upwards into a pouring space;
 f) pouring hot fluid material adapted for lipsticks into said shaped cavity of the ogive;
 g) cooling the poured material to obtain a solidified lipstick;
 h) extracting the solidified lipstick from the internal cavity of the ogive.

A lipstick is thus obtained, which has an external lateral surface provided with any tridimensional design deriving from laser-working of the initial metal tap.

According to an embodiment of the process according to the present invention, the solidified lipstick extracted from the ogive may then be subjected to a step of spraying small pearls, or pearling, which is performed inside a chamber by a cyclone system which, without using solvents or the like, allows a desired number of tiny pearls to adhere in a uniform manner, without leaving gaps or overdoses, to the external lateral surface of the lipstick to confer a particularly bright and pleasant appearance thereto.

The characteristics of the process according to the present invention and of the lipstick which may derive therefrom will become apparent from the following detailed description of exemplary embodiments.

Figure 1:
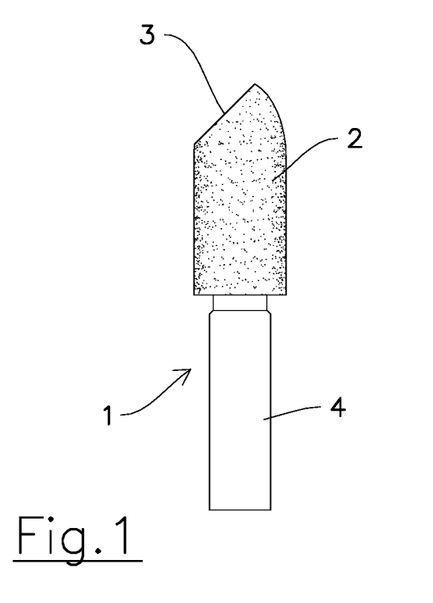
FIGS. 1 and 2 show different side views of a rough tap which can be used to implement the process according to the present invention.
Figure 2:
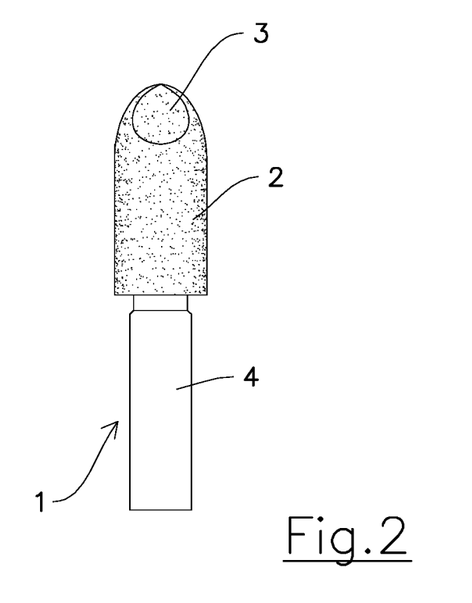

A metal tap 1 which can be used for the process according to the present invention is shown in FIGS. 1 and 2, and comprises a head part 2, initially in rough state, which is shaped like a usual lipstick, i.e. has a cylindrical shape ending with a pointed end with oblique cut 3. A tang 4, which can be used to support and handle tap 1, axially extends from the base of head 2.

Figure 3:
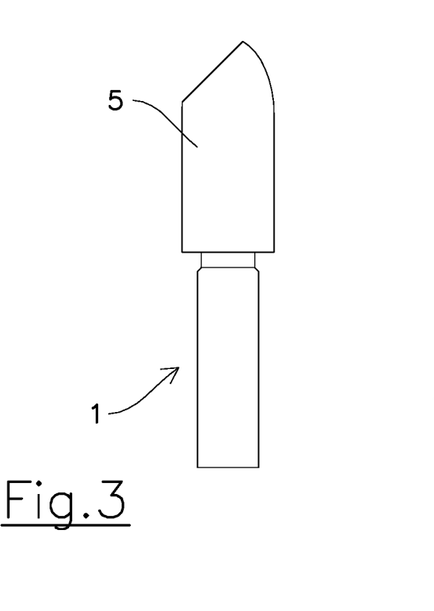
FIGS. 3 and 4 show the same tap after an operation of polishing a head portion thereof intended to define the shape of a lipstick.
Figure 4:
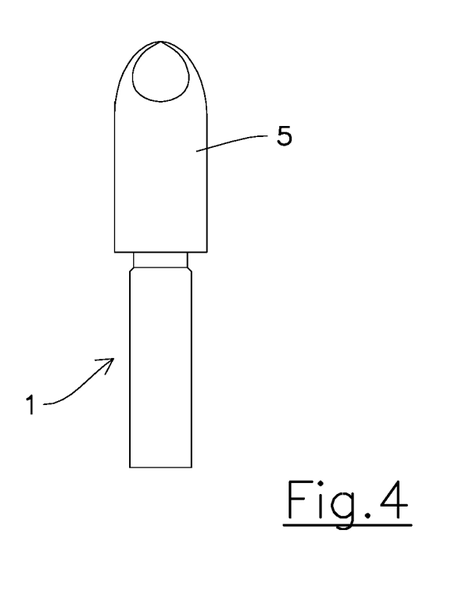

The process according to the present invention starts by mirror-polishing the head part 2, which is performed with any equipment of known type and allows obtaining a tap with polished head part 5, as shown in FIGS. 3 and 4.

Figure 7:
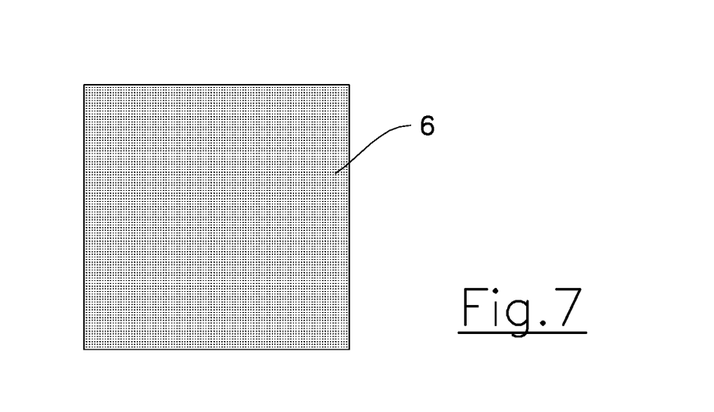
FIG. 7 shows an enlarged detail of the external lateral surface of the laser-worked head portion of the tap after the laser-working operation.

By using any equipment known per se, the polished head 5 of the tap is subjected to laser-working, which produces a laser-worked head 6, the external lateral surface of which has a desired tridimensional design, e.g. such as a velvet design or that of other fabric, as shown in FIG. 7.

Figure 8:
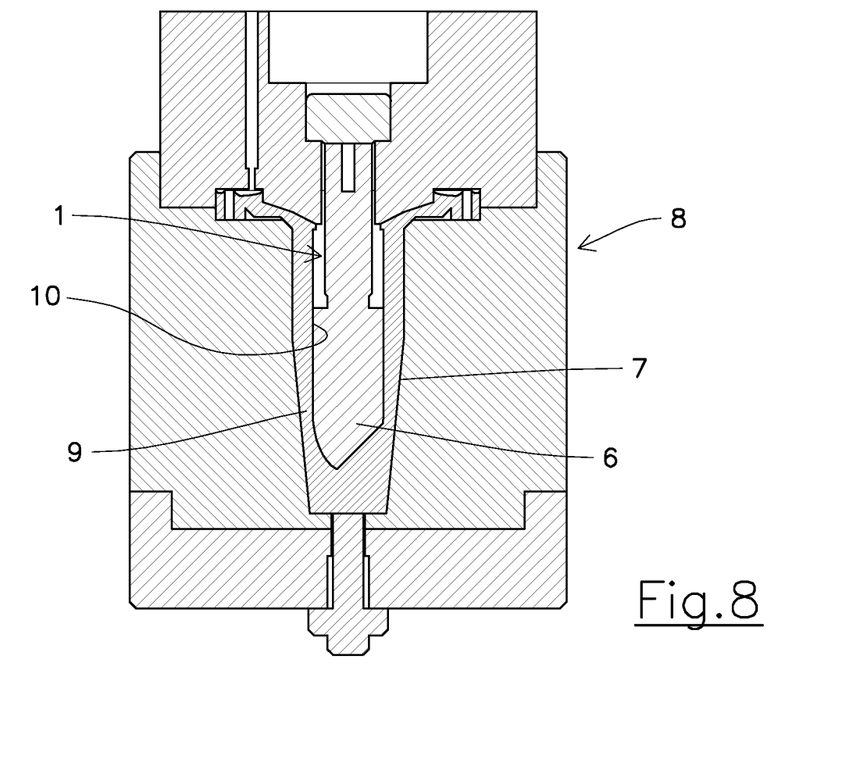
FIG. 8 shows a section view of a machine for molding a hollow ogive of malleable plastic material using a tap with laser-machined head part.
Figure 9:
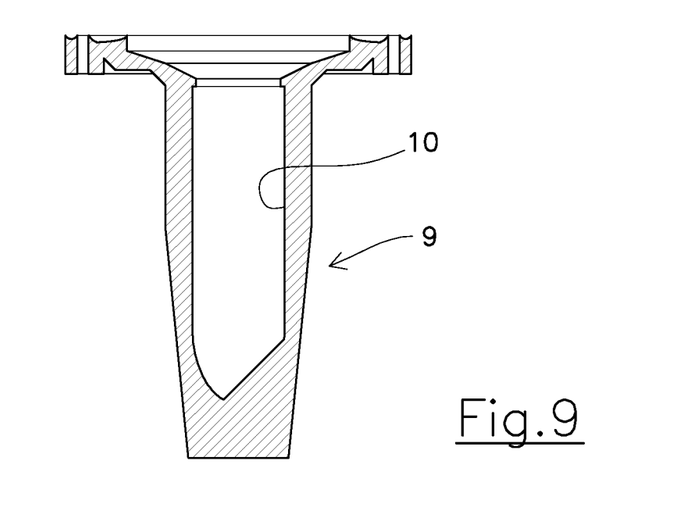
FIG. 9 shows the ogive after the extraction from the molding machine.
Figure 10:
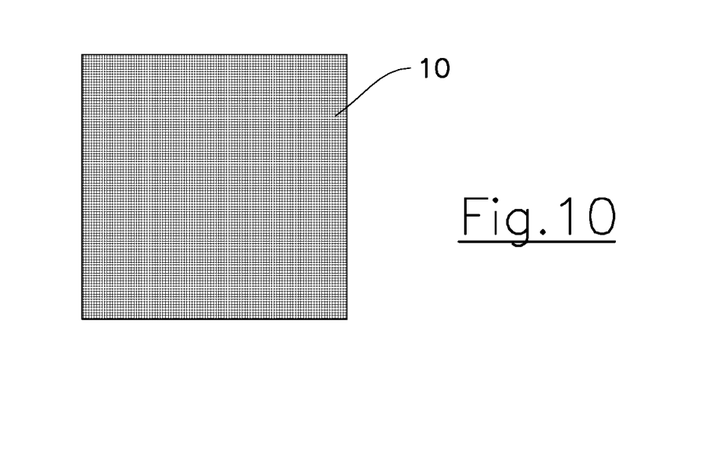
FIG. 10 shows an enlarged detail of the lateral surface of the internal cavity of the ogive after the extraction from the mold and the separation from the tap with laser-worked head part.

The tap with laser-worked head 6 is then used to obtain a hollow ogive 9 made of malleable plastic material (shown with molding finished in FIG. 9) inside a molding cavity 7 of a molding machine 8 of known type (e.g. such as that described in EP 1 473 133 A1), shown in FIG. 8, the internal cavity 10, facing upwards, of the ogive having a design, shown in the enlarged detail in FIG. 10, which is complementary to that of the external lateral surface of the laser-worked head 6.

Figure 11:
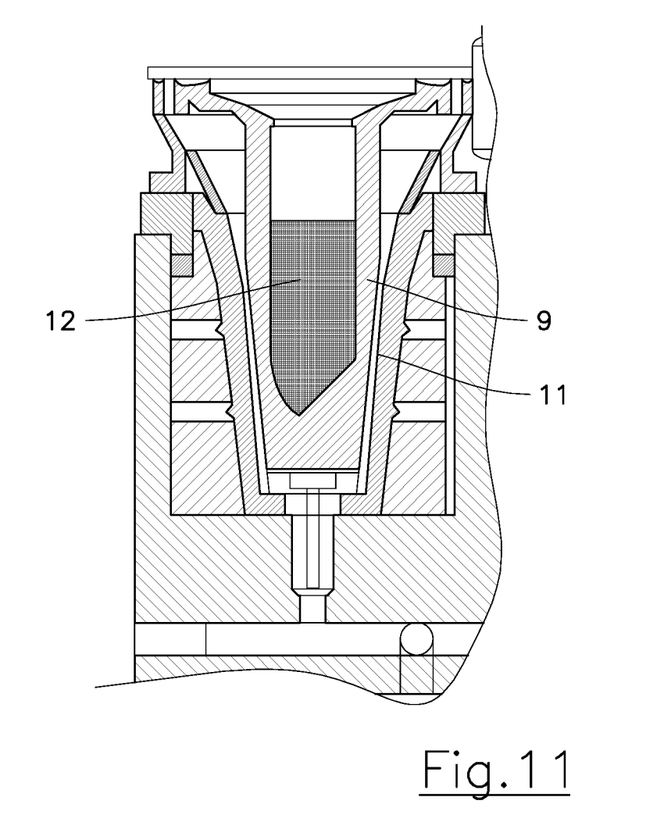
FIG. 11 shows a section view of a casting machine for forming a lipstick inside the cavity of the ogive.

Once extracted from the molding machine, the hollow ogive 9 is inserted into a molding space 11 of a molding machine of any known type (e.g. such as that described in EP 1 437 062 A1), shown in FIG. 11, which receives by pouring a fluid product 12 adapted to form a lipstick.

Figure 5:
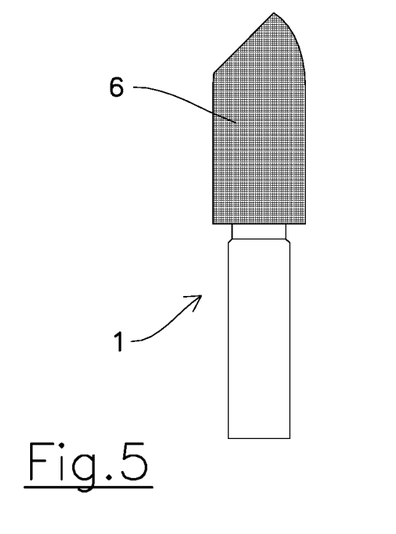
FIGS. 5 and 6 show the same tap (or laser-worked tap) with laser-worked head part at the end of an operation of laser-working the head part thereof.
Figure 6:
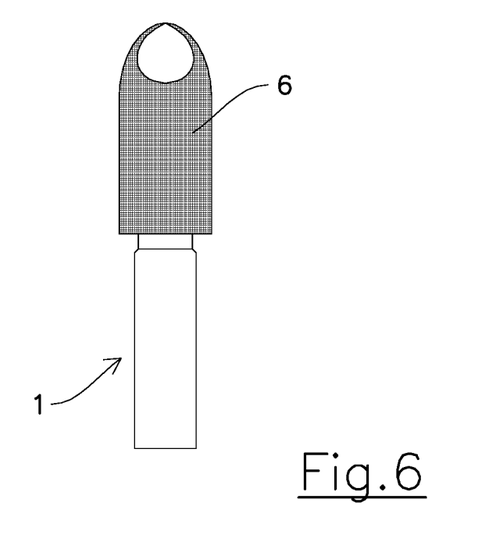
Figure 12:
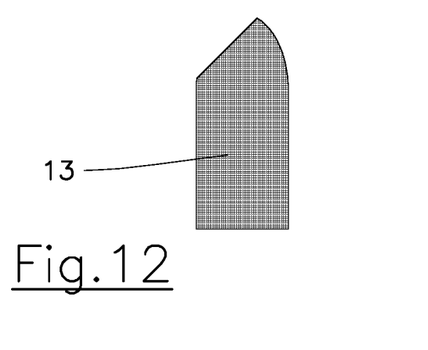
FIGS. 12 and 13 show different side views of the lipstick extracted from the ogive.
Figure 13:
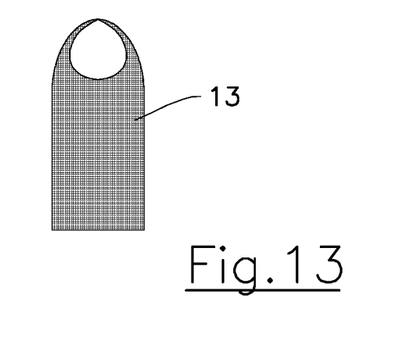

After the operations of cooling, solidifying and extracting from the internal cavity 10 of the ogive 9, a lipstick 13 is obtained, such as that shown in FIGS. 12 and 13, which has an external lateral surface corresponding to that of the laser-worked head 6 of the tap in FIGS. 5 and 6, in this example with velvet or other fabric type design.

Figure 14:
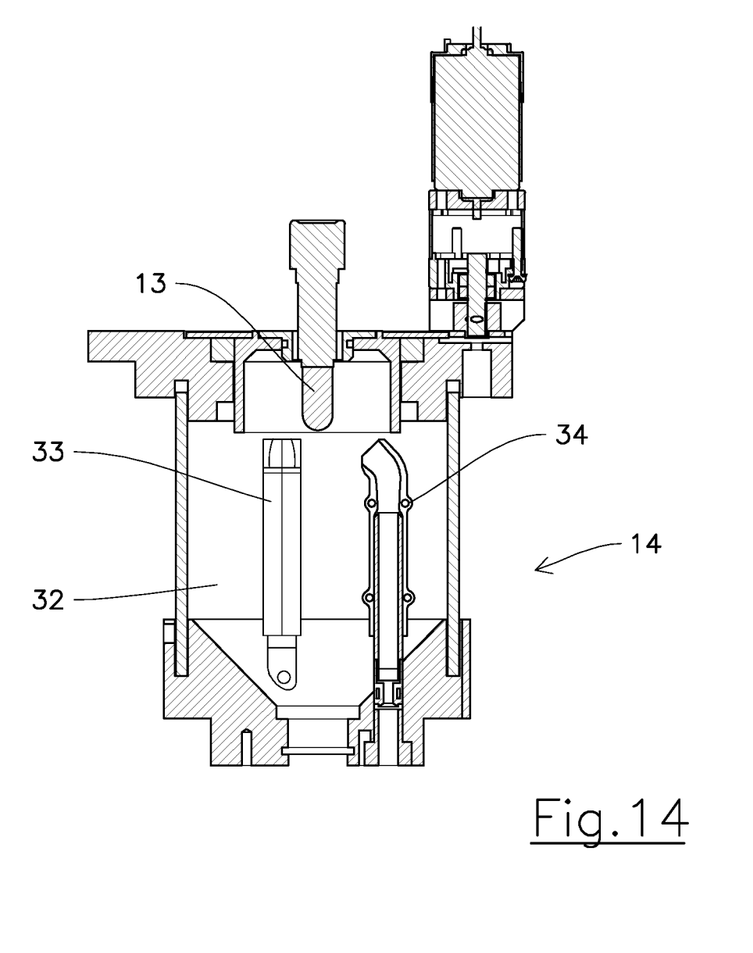
FIG. 14 shows a diagrammatic view of a cyclone machine in which a possible final pearling of the lipstick is performed.
Figure 15:
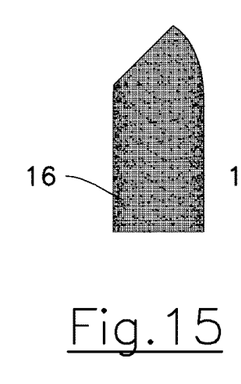
FIGS. 15 and 16 show different side views of the lipstick in FIGS. 12 and 13 after the pearling operation.
Figure 16:
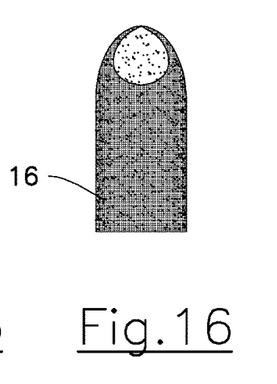

If desired, the lipstick 13 thus obtained can be subjected to spraying of pearls, or "pearling", in a cyclone system, e.g. such as that diagrammatically shown and designated as a whole by reference numeral 14 in FIG. 14, where reference numeral 13 indicates a possible lipstick rotated inside a sealed chamber 31, reference numeral 32 indicates a spraying or pearling chamber, reference numerals 33 and 34 indicate the pearl dispensers 15 which make the pearls fluctuate peripherally to the lipstick 13; by virtue of a venturi effect inside the dispensers 33 and 34, the pearls in excess which do not stick to the lipstick fall inside the spraying chamber 32 to be then reintroduced for the next lipstick. So, the lipstick is coated with pearls 15 which stick thereto in a homogeneous manner without leaving gaps or excesses, and confer to the final lipstick 16, shown in FIGS. 15 and 16, a super-iridescent effect, much more striking than otherwise obtainable by traditional pearl spraying mixed with solvents.

Figure 17:
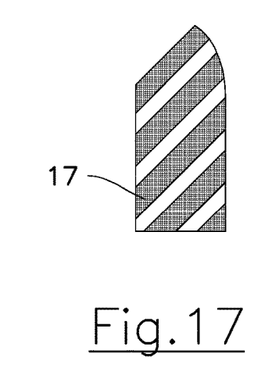
FIGS. 17-32 show different further side views of examples of lipsticks with shaped lateral surface without or with pearling which can be obtained by the process of the present invention.
Figure 18:
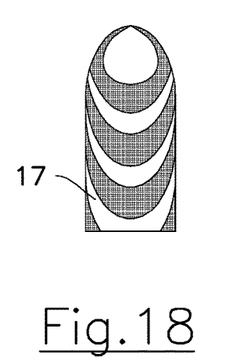
Figure 19:
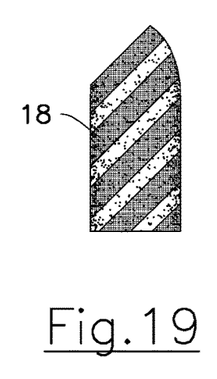
Figure 20:
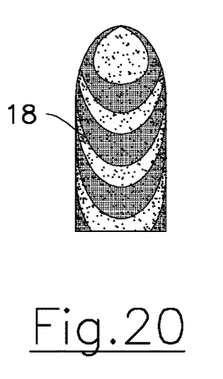
Figure 21:
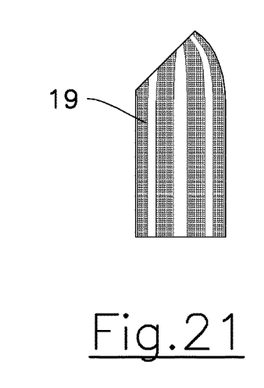
Figure 22:
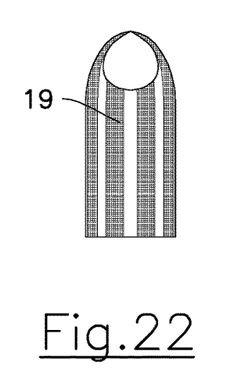
Figure 23:
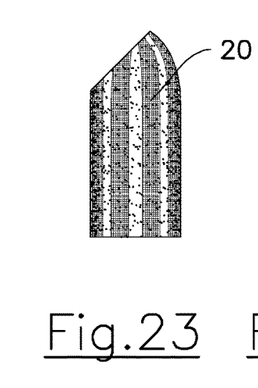
Figure 24:
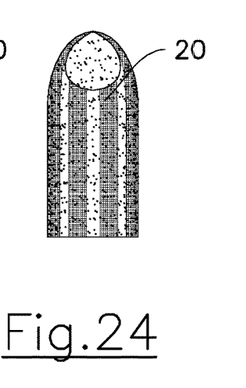
Figure 25:
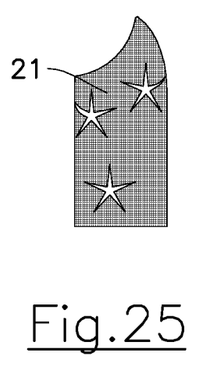
Figure 26:
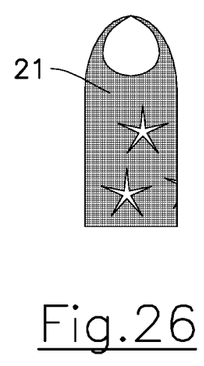
Figure 27:
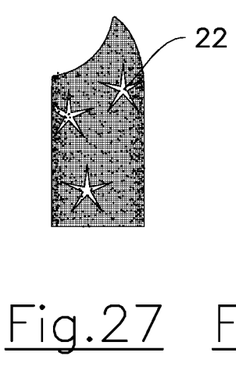
Figure 28:
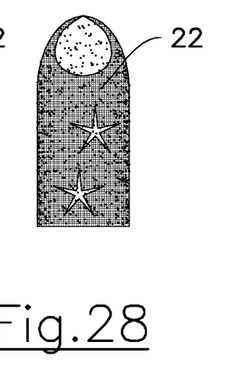
Figure 29:
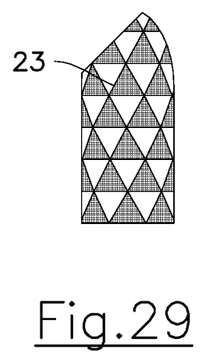
Figure 30:
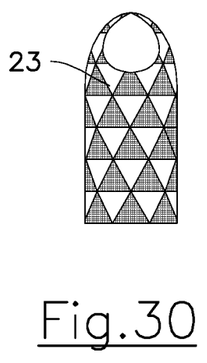
Figure 31:
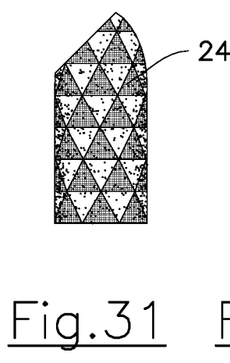
Figure 32:
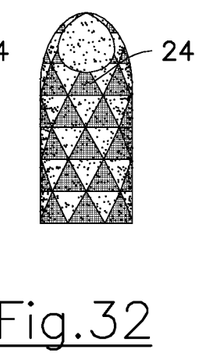

As explained above, the final lipstick, without or with pearling, may have any other design according to the design drawn by laser-working the head part of the initial tap. FIGS. 17-32 show only a few examples of lipsticks without or with pearling, which may be obtained by the process according to the present invention. In particular, FIGS. 17-18 show a lipstick 17 with oblique un-pearled strips and FIGS. 19-20 show a similar lipstick with oblique strips 18 with pearls 15, FIGS. 21-22 show a lipstick with vertical un-pearled strips 19, and FIGS. 23-24 show a similar lipstick with vertical strips 20 with pearls 15, FIGS. 25-26 show a lipstick with an un-pearled star design 21, and FIGS. 27-28 show a similar lipstick with star design 22 with pearls 15, FIGS. 29-30 show a lipstick 23 with light and dark un-pearled triangles, and FIGS. 31-32 show a similar lipstick 24 with light and dark triangles with pearls 15.

The invention claimed is:

1. A process for production of a lipstick having a tridimensional surface effect, comprising the following succession of steps:
   a) providing a metallic tap (1) with a head part (2) that is in a shape of a lipstick, the head part (2) having an external lateral surface;
   b) mirror-like polishing the external lateral surface of the head part (2) of the metallic tap (1) to obtain a head part with a polished external lateral surface (5);
   c) laser working the polished external lateral surface (5) of the head part (2) to obtain a tap with laser-worked head part (6) worked according to the tridimensional surface effect;
   d) introducing the metallic tap (1) with laser-worked head part (6) into an internal cavity (7) of a molding machine (8) to form a molding space (11) between the metallic tap (1) and the internal cavity (7);
   e) forming by molding, inside the molding space (11), a hollow ogive (9) of a malleable plastic material with an internal cavity (10) shaped in a complementary way with respect to the tridimensional surface effect;
   f) introducing the hollow ogive (9) with the internal cavity (10) looking upwards into a pouring space formed by a U-shaped internal cavity of the same or a further molding machine, the U-shaped internal cavity having a shape complementary with an external shape of the hollow ogive (9);
   g) pouring a fluid material (12) adapted for a lipstick into the internal cavity (10) of the hollow ogive (9);
   h) cooling the poured fluid material (12) to obtain a solidified lipstick (13) with a lateral surface having the tridimensional surface effect;
   i) drawing the solidified lipstick (13) from the internal cavity (10) of the hollow ogive (11); and
   j) covering the solidified lipstick (13) with pearls by means of a cyclone system.

2. The process according to claim 1, wherein the tridimensional surface effect is a velvet surface effect.

3. The process according to claim 1, wherein the tridimensional surface effect is a fabric surface effect.

4. The process according to claim 1, wherein the head part (2) that is in the shape of a lipstick has a cylindrical shape ending with a pointed end with oblique cut (3).

5. A lipstick obtained by the according to claim 1, wherein the lipstick has an external lateral surface with a pearled tridimensional surface effect.

6. The lipstick according to claim 5, wherein the tridimensional surface effect is a velvet surface effect.

7. The lipstick according to claim 5, wherein the tridimensional surface effect is a fabric surface effect.

8. The lipstick according to claim 5, wherein the lipstick has a cylindrical shape ending with a pointed end with oblique cut (3).

9. A process for production of a lipstick having a tridimensional surface effect, consisting of the following succession of steps:
   a) providing a metallic tap (1) with a head part (2) that is in a shape of a lipstick, the head part (2) having an external lateral surface;
   b) mirror-like polishing the external lateral surface of the head part (2) of the metallic tap (1) to obtain a head part with a polished external lateral surface (5);
   c) laser working the polished external lateral surface (5) of the head part (2) to obtain a tap with laser-worked head part (6) worked according to the tridimensional surface effect;
   d) introducing the metallic tap (1) with laser-worked head part (6) into an internal cavity (7) of a molding machine (8) to form a molding space (11) between the metallic tap (1) and the internal cavity (7);
   e) forming by molding, inside the molding space (11), a hollow ogive (9) of a malleable plastic material with an internal cavity (10) shaped in a complementary way with respect to the tridimensional surface effect;
   f) introducing the hollow ogive (9) with the internal cavity (10) looking upwards into a pouring space formed by a U-shaped internal cavity of the same or a further molding machine, the U-shaped internal cavity having a shape complementary with an external shape of the hollow ogive (9);
   g) pouring a fluid material (12) adapted for a lipstick into the internal cavity (10) of the hollow ogive (9);
   h) cooling the poured fluid material (12) to obtain a solidified lipstick (13) with a lateral surface having the tridimensional surface effect;
   i) drawing the solidified lipstick (13) from the internal cavity (10) of the hollow ogive (11); and
   j) covering the solidified lipstick (13) with pearls by means of a cyclone system.

10. The process according to claim 9, wherein the tridimensional surface effect is a velvet surface effect.

11. The process according to claim 9, wherein the tridimensional surface effect is a fabric surface effect.

12. The process according to claim 9, wherein the head part (2) that is in the shape of a lipstick has a cylindrical shape ending with a pointed end with oblique cut (3).

13. A lipstick obtained by the process according to claim 9, wherein the lipstick has an external lateral surface with a pearled tridimensional surface effect.

14. The lipstick according to claim 13, wherein the tridimensional surface effect is a velvet surface effect.

15. The lipstick according to claim 13, wherein the tridimensional surface effect is a fabric surface effect.

16. The lipstick according to claim 13, wherein the lipstick has a cylindrical shape ending with a pointed end with oblique cut (3).

\* \* \* \* \*